(12) United States Patent
Cao

(10) Patent No.: US 12,535,163 B2
(45) Date of Patent: Jan. 27, 2026

(54) FEMALE CONNECTOR AND CONNECTOR ASSEMBLY COMPRISING SAME

(71) Applicant: Illinois Tool Works Inc., Glenview, IL (US)

(72) Inventor: Cong Cao, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 92 days.

(21) Appl. No.: 18/220,544

(22) Filed: Jul. 11, 2023

(65) Prior Publication Data

US 2024/0019060 A1   Jan. 18, 2024

(30) Foreign Application Priority Data

Jul. 12, 2022   (CN) .......................... 202210818915.8
Jun. 28, 2023   (CN) .......................... 202310778521.9

(51) Int. Cl.
   *F16L 37/12*   (2006.01)

(52) U.S. Cl.
   CPC ....... *F16L 37/1225* (2013.01); *F16L 2201/10* (2013.01)

(58) Field of Classification Search
   CPC ..... F16L 37/1225; F16L 37/098; F16L 37/12; F16L 37/0885; F16L 37/144
   See application file for complete search history.

(56) References Cited

U.S. PATENT DOCUMENTS

| | | |
|---|---|---|
| 5,178,424 A | 1/1993 | Klinger |
| 5,342,099 A | 8/1994 | Bahner |
| 5,441,313 A | 8/1995 | Kalahasthy |
| 5,785,358 A | 7/1998 | Kujawski |
| 5,893,590 A | 4/1999 | Klinger |
| 6,371,529 B1 | 4/2002 | Szabo |

(Continued)

FOREIGN PATENT DOCUMENTS

| | | |
|---|---|---|
| CN | 107061897 B | 6/2019 |
| CN | 112096991 A | 12/2020 |

(Continued)

OTHER PUBLICATIONS

Nagata, Quick Pipe Disconnect Coupling, Oct. 15, 2003, JP-2003294185-A.*

*Primary Examiner* — Zachary T Dragicevich
*Assistant Examiner* — James A Linford
(74) *Attorney, Agent, or Firm* — McAndrews, Held & Malloy, Ltd.

(57) ABSTRACT

A female connector having a housing and a retaining clamp. The housing has a channel and a housing window. The retaining clamp is around at least part of the housing and comprises a pair of arms deflectable towards or away from each other. Each arm is provided with a retaining groove, enters the channel of the housing through the housing window and is in a travel path of a retaining flange of a male connector. During the female connector receiving the male connector, when the retaining flange is in contact with the arms but is not yet aligned with the retaining grooves, it deflects the arms out of the travel path of the retaining flange, when the retaining flange is aligned with the retaining grooves, the arms return to the travel path of the retaining flange to accommodate the retaining flange in the retaining grooves.

20 Claims, 17 Drawing Sheets

(56) References Cited

U.S. PATENT DOCUMENTS

| | | |
|---|---|---|
| 6,612,622 B2 | 9/2003 | Andre |
| 11,774,024 B2 | 10/2023 | Barthel |
| 2002/0158465 A1 | 10/2002 | Tsurumi |
| 2006/0113790 A1 | 6/2006 | Inoue |
| 2021/0396336 A1 | 12/2021 | Schröter |
| 2022/0003347 A1 | 1/2022 | Barthel |
| 2022/0154865 A1 | 5/2022 | Passas-Lagos |
| 2023/0121914 A1 | 4/2023 | Gauthier |
| 2023/0184360 A1 * | 6/2023 | Gabbey ............... F16L 37/1225 285/93 |

FOREIGN PATENT DOCUMENTS

| | | | |
|---|---|---|---|
| CN | 213871595 U | 8/2021 | |
| DE | 102020126814 A1 * | 4/2022 | ............. F01N 13/18 |

* cited by examiner

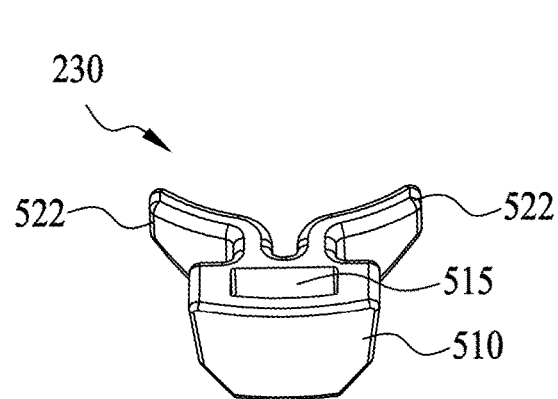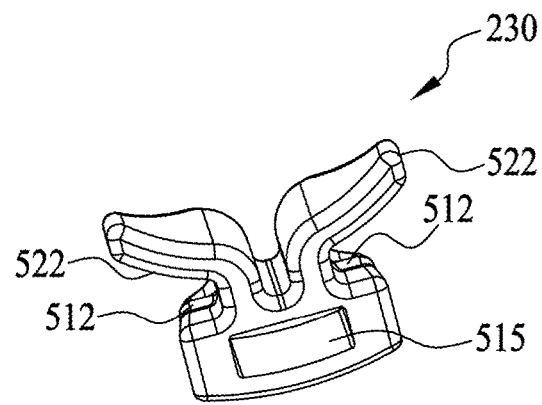
Fig. 5A                    Fig. 5B
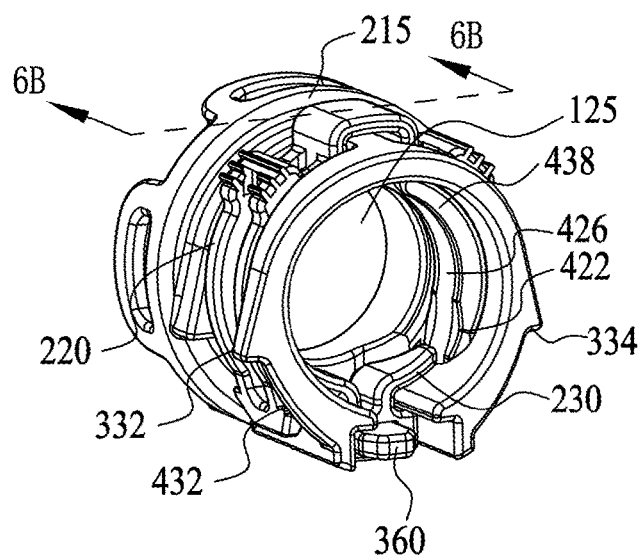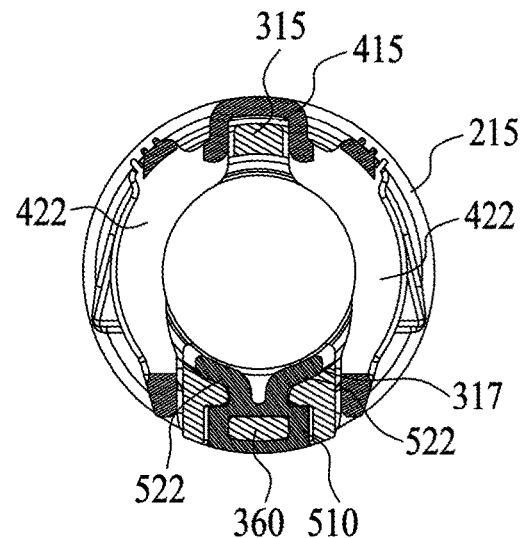
Fig. 6A                    Fig. 6B

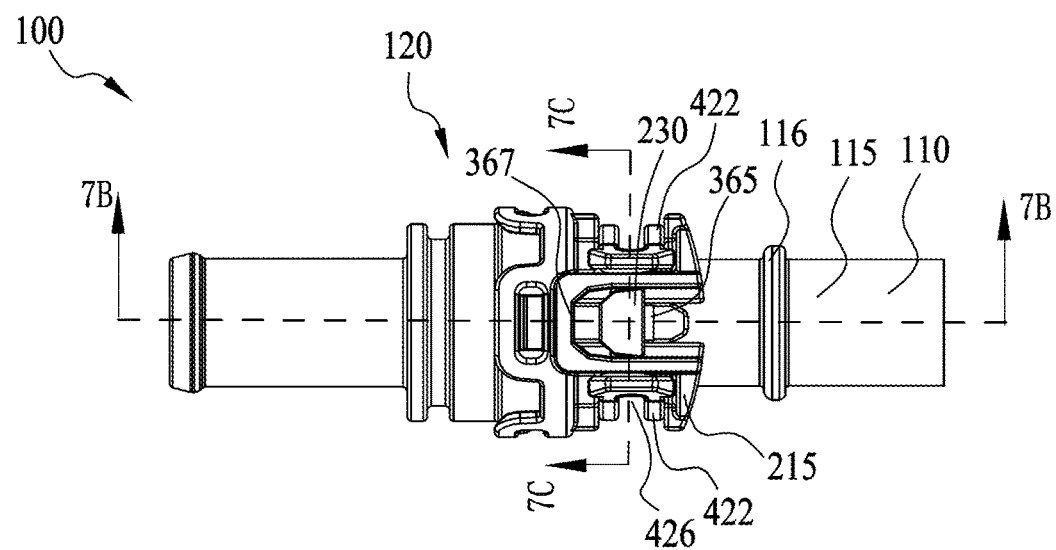
Fig. 7A
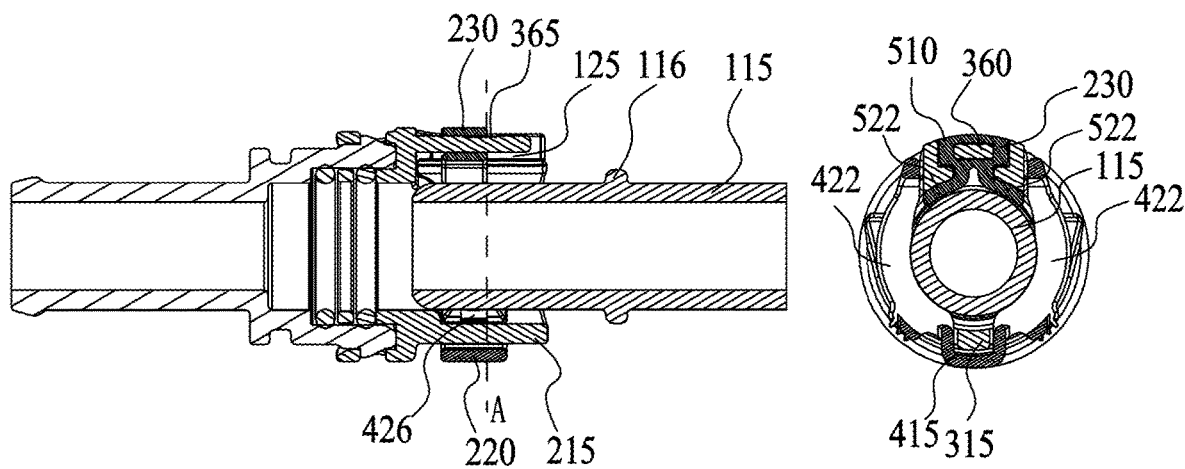
Fig. 7B
Fig. 7C

FEMALE CONNECTOR AND CONNECTOR ASSEMBLY COMPRISING SAME

RELATED APPLICATIONS

The present application claims the benefit of Chinese Patent Application Nos. 2022108189158, filed Jul. 12, 2022, and 2023107785219, filed Jun. 28, 2023, each titled "Female Connector and Connector Assembly Comprising Same," the contents of which are hereby incorporated by reference.

TECHNICAL FIELD

The present disclosure relates to a female connector for connection with a male connector (or a pipe) and a connector assembly comprising the female connector, and in particular to a quick female connector that may be released from and connected to the male connector with a simple operation.

BACKGROUND

A type of female connector is used for receiving and being secured with a male connector (pipe) with an annular retaining flange on an outer surface thereof. This type of female connector typically comprises a tubular housing and a latch arranged on the tubular housing. The latch may cooperate with the retaining flange on the male connector received in the housing of the female connector so as to secure the male connector with the female connector. The latch can release the male connector from the female connector.

SUMMARY

According to a first aspect of the present disclosure, the present disclosure provides a female connector for receiving and being secured with a male connector having a retaining flange, which comprises a housing and a retaining clamp. The housing defines therein a channel extending in an axial direction and is provided with a housing window. The retaining clamp is arranged around at least part of the housing. The retaining clamp comprises a pair of arms. The pair of arms are connected to each other and deflectable towards or away from each other. The pair of arms each is provided with a retaining groove, and the portion of each of the pair of arms that is provided with the retaining groove enters the channel of the housing through the housing window and is in a travel path of the retaining flange. The retaining clamp is configured such that during the female connector receiving and being secured with the male connector: when the male connector travels relative to the housing until the retaining flange is in contact with the pair of arms but is not yet aligned with the retaining grooves, the retaining flange exerts a pushing force on the pair of arms to deflect the pair of arms away from each other and out of the travel path of the retaining flange; and when the male connector travels until the retaining flange is aligned with the retaining grooves, the pair of arms are no longer subjected to the pushing force exerted by the retaining flange and are deflected towards each other to return to the travel path of the retaining flange, and the retaining flange is accommodated inside the retaining grooves, such that the male connector and the female connector are secured by the retaining clamp.

The female connector according to the first aspect of the present disclosure, the housing comprises a pair of stopping portions provided on an outer surface thereof and respectively on two opposite sides thereof in a circumferential direction. The retaining clamp comprises a pair of stopped portions respectively provided on the pair of arms. When no pushing force is applied to the pair of arms, the retaining clamp is held on the housing by a clamping force of the pair of arms. When the pair of arms are deflected away from each other to a certain extent by the application of a pushing force, the stopped portions of the pair of arms respectively abut against the pair of stopping portions of the housing to hold the retaining clamp on the housing.

The female connector according to the first aspect of the present disclosure, each of the pair of arms has a width direction. Each of the pair of arms comprises a front arm portion and a rear arm portion. The retaining groove is between the front arm portion and the rear arm portion in the width direction. During the female connector receiving and being secured with the male connector, the retaining flange exerts a pushing force on the front arm portions such that the pair of arms are deflected away from each other and, after the retaining flange is accommodated in the retaining grooves, the front arm portion and the rear arm portion restrict the retaining flange from moving along the channel.

The female connector according to the first aspect of the present disclosure, the front arm portion has an outer guide surface inclined inwardly. The outer guide surface is configured to guide the retaining flange of the male connector to enter between the front arm portions of the pair of arms.

The female connector according to the first aspect of the present disclosure, the stopped portions are formed by protruding from two sides of the arms in the width direction. The pair of stopping portions are formed by protruding from the outer surface of the housing.

The female connector according to the first aspect of the present disclosure, the retaining clamp further comprises a pair of operating projections respectively provided on the pair of arms. The pair of arms are configured to be deflected away from each other under a pushing force applied by an operator operating the pair of operating projections, so as to release the male connector from the female connector.

The female connector according to the first aspect of the present disclosure, the retaining clamp further comprises a base. The pair of arms each is connected to the base at a proximal end thereof and is deflectable relative to the base. The base has a limiting recess. The housing is provided with a limiting portion, and the limiting portion is accommodated in the limiting recess to restrict the retaining clamp from moving in the circumferential direction relative to the housing.

The female connector according to the first aspect of the present disclosure, the housing window comprises a first side window section and a second side window section. The pair of arms at least partially enter the channel of the housing through the first side window section and the second side window section respectively. The housing further comprises a beam provided between the first side window section and the second side window section. The beam forms the limiting portion.

The female connector according to the first aspect of the present disclosure, the pair of arms each has a free distal end. The stopped portion is provided at the free distal end.

The female connector according to the first aspect of the present disclosure, the retaining groove extends from the proximal end to the free distal end of the arm, the front arm portion and the rear arm portion are connected at the free distal end by an end arm portion.

The female connector according to the first aspect of the present disclosure, the retaining groove runs through the arm in a thickness direction of the arm.

The female connector according to the first aspect of the present disclosure, the retaining clamp is C-shaped.

According to a second aspect of the present disclosure, the present disclosure provides a connector assembly. The connector assembly comprises a female connector according to the first aspect of the present disclosure and a male connector received by and secured with the female connector.

BRIEF DESCRIPTION OF THE DRAWINGS

FIG. 5A is a perspective view of an indicating slider of the female connector shown in FIG. 2 from a first perspective;

FIG. 5B is a perspective view of the indicating slider of the female connector shown in FIG. 2 from a second perspective;

FIG. 6A is a perspective view of the receiving section of the housing, the retaining clamp and the indicating slider of the female connector shown in FIG. 2 that are assembled;

FIG. 6B is a cross-sectional view of the receiving section of the housing, the retaining clamp and the indicating slider of the female connector shown in FIG. 6A along line 6B-6B;

FIG. 7A is a top view of the connector assembly shown in FIG. 1A in an initial mounting position;

FIG. 7B is a cross-sectional view of the connector assembly of FIG. 7A along line 7B-7B;

FIG. 7C is a cross-sectional view of the connector assembly of FIG. 7A along line 7C-7C;

DETAILED DESCRIPTION OF EMBODIMENTS

Various specific implementations of the present disclosure will be described below with reference to the accompanying drawings which form a part of this description. It should be understood that although the terms indicating directions, such as "upper", "lower", "left", "right", and so on are used in the present disclosure to describe structural parts and elements in various examples of the present disclosure, these terms are used herein only for ease of description and are determined based on the exemplary orientations as shown in the accompanying drawings. Since the embodiments disclosed in the present disclosure can be arranged in different directions, these terms indicating directions are merely illustrative and should not be considered as limitations.

Figure 1A:
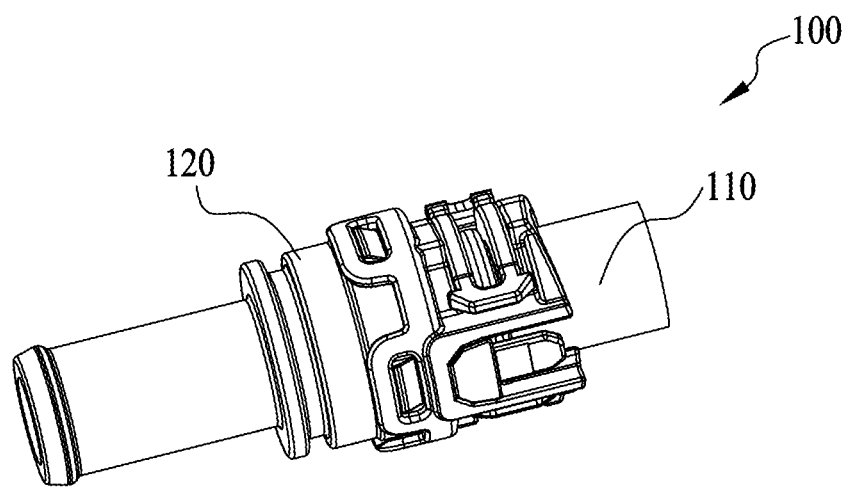
FIG. 1A is a perspective view of a connector assembly according to an embodiment of the present disclosure.
Figure 1B:
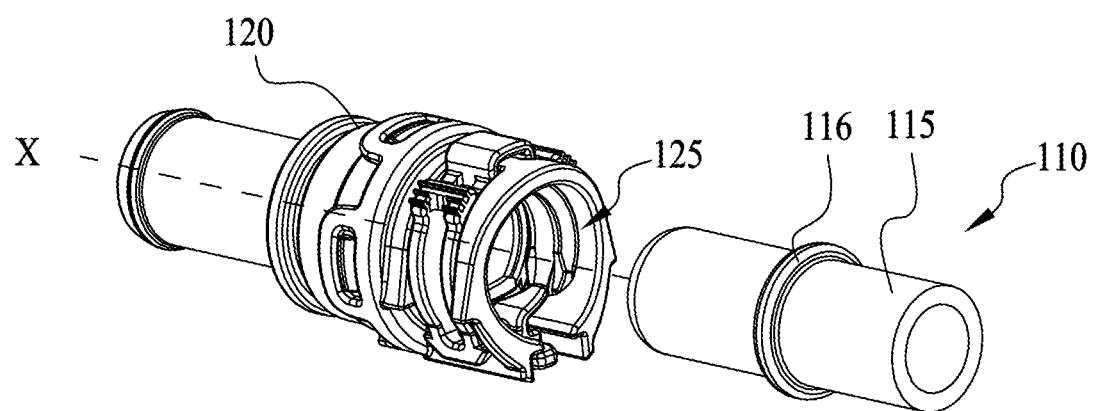
FIG. 1B is a partially exploded view of the connector assembly shown in FIG. 1A.

FIGS. 1A and 1B respectively show a perspective view and a partially exploded view of a connector assembly 100 according to an embodiment of the present disclosure, showing the overall structure of the connector assembly 100. As shown in FIGS. 1A and 1B, the connector assembly 100 comprises a male connector 110 and a female connector 120 detachably connected to each other. The male connector 110 is a pipe which includes a tubular body 115, and a retaining flange 116 arranged on an outer surface of the tubular body 115. The retaining flange 116 is in the form of a ring, protrudes outwards from the outer surface of the tubular body 115 and extends in a circumferential direction of the tubular body 115. The female connector 120 has an axis X and a channel 125 extending in the axial direction. The male connector 110 can be received by the female connector 120, i.e., inserted in the channel 125 of the female connector 120. When the male connector 110 is inserted in place in the female connector 120, the male connector 110 and the female connector 120 are secured by the retaining flange 116.

Figure 2:
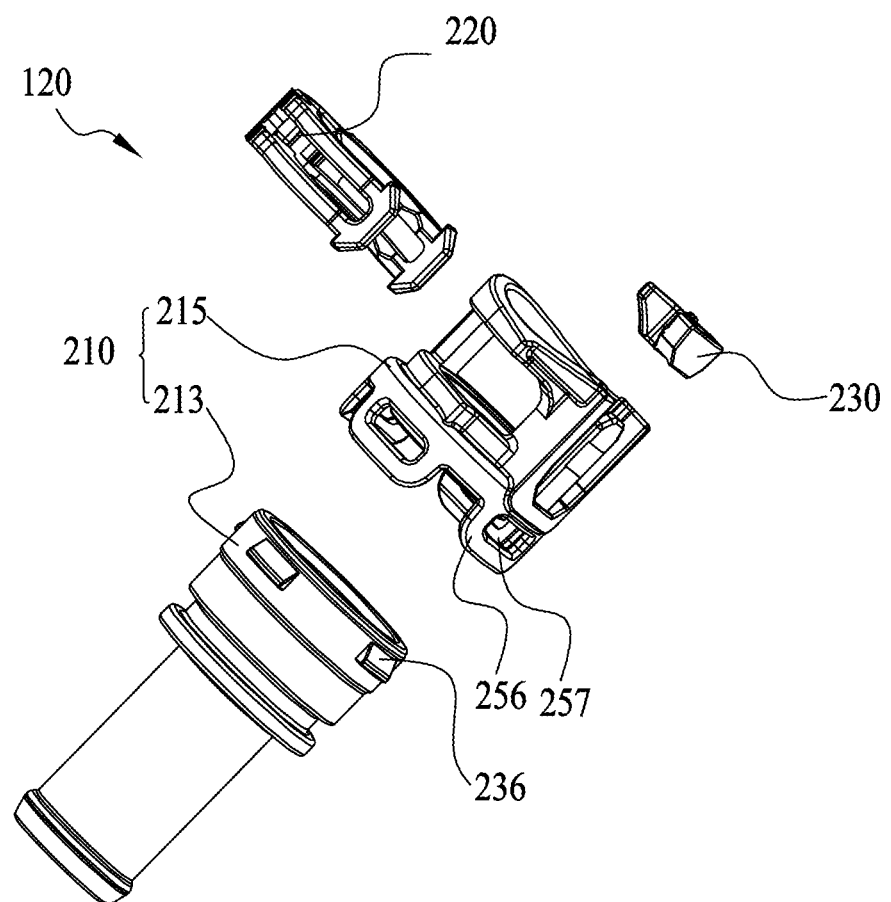
FIG. 2 is an exploded view of a female connector of the connector assembly shown in FIG. 1A.

FIG. 2 is an exploded view of the female connector 120 of the connector assembly 100 shown in FIG. 1A, showing components of the female connector 120. As shown in FIG. 2, the female connector 120 includes a housing 210, and a retaining clamp 220 and an indicating slider 230 that are arranged on the housing 210, and all of these components are made of a plastic material.

The housing 210 is generally tubular, and the axial direction of the housing 210 is the same as the axial direction of the female connector 120. The housing 210 defines the channel 125 extending in the axial direction and includes a receiving section 215 and a connecting section 213. The receiving section 215 is configured for receiving and being secured with the male connector, and the connecting section 213 is configured for connecting the female connector 120 with other components (e.g., a hose). The retaining clamp 220 and the indicating slider 230 are arranged on the receiving section 215. The receiving section 215 and the connecting section 213 are detachably connected to each other, for example by means of a snap fit connection. To this end, the connecting section 213 is provided with a plurality of wedge-shaped projections 236 arranged in a circumferential direction, the receiving section 215 is provided with a corresponding number of lugs 256, and each of the lugs 256 is provided with a receiving hole 257 for receiving a wedge-shaped projection 236. Since the receiving section 215 and the connecting section 213 are configured as separate portions, when there is a different model for the male connector 110, a suitable receiving section 215 may be selected depending on the model of the male connector 110 without replacing the connecting section 213, thus enabling a better adaptability of the female connector 120.

The retaining clamp 220 is clamped on the receiving section 215 and configured to cooperate with the retaining flange 116 of the male connector 110 so as to secure the male connector 110 and the female connector 120. The indicating slider 230 is mounted on the receiving section 215 for indicating that the male connector 110 is mounted in place in the female connector 120.

Figure 3A:
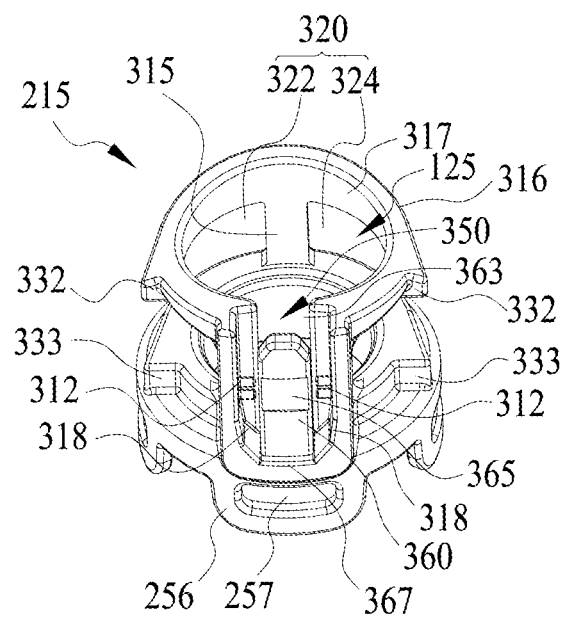
FIG. 3A is a perspective view of a receiving section of a housing of the female connector shown in FIG. 2 from a first perspective.
Figure 3B:
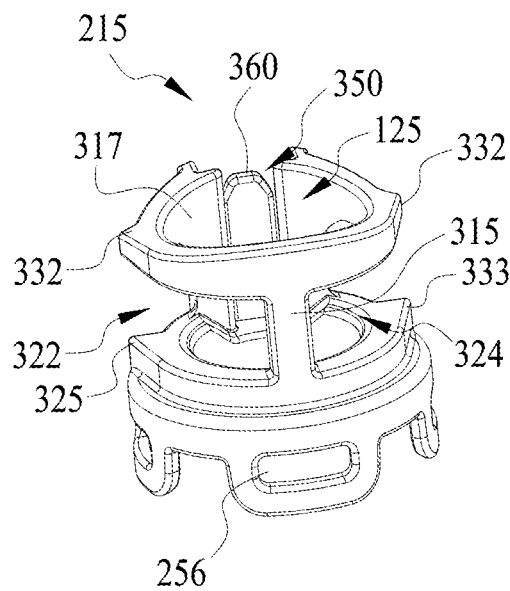
FIG. 3B is a perspective view of the receiving section of the housing of the female connector shown in FIG. 2 from a second perspective.

FIGS. 3A and 3B are respectively perspective views of the receiving section 215 of the housing 210 of the female connector 120 from two different perspectives, showing the specific structure of the receiving section 215 of the housing 210. As shown in FIGS. 3A and 3B, the receiving section 215 of the housing 210 has an outer surface 316 and an inner wall 317, the receiving section 215 is provided with a housing window 320, and the housing window 320 runs through the outer surface 316 and the inner wall 317 of the housing 210 to connect with the channel 125. The housing window 320 includes a first side window section 322 and a second side window section 324, and a beam 315 arranged between the first side window section 322 and the second side window section 324. The beam 315 extends in the axial direction of the housing 210 and forms a limiting portion. The first side window section 322 and the second side window section 324 each extends in the circumferential direction of the housing 210 such that the receiving section 215 has an overall hollowed-out shape.

The receiving section 215 of the housing 210 further includes a pair of stopping portions 332 provided on the outer surface 316 of the receiving section 215. The pair of stopping portions 332 are arranged on opposite sides of the receiving section 215 in the circumferential direction. The receiving section 215 of the housing 210 further includes a pair of additional stopping portions 333. The pair of additional stopping portions 333 are also arranged on the opposite sides of the receiving section 215 in the circumferential direction. The stopping portions 332 and the additional stopping portions 333 are on opposite sides of the housing window 320 in the axial direction. The stopping portion 332 and the additional stopping portion 333, which are on the same side of the housing 210 in the circumferential direction, are in the same circumferential position on the receiving section 215. The stopping portions 332 and additional stopping portions 333 are formed by protruding from the outer surface 316 of the housing 210 and are configured to cooperate with the retaining clamp 220 so as to retain the retaining clamp 220 on the housing 210.

The receiving section 215 of the housing 210 is further provided with an opening 350 extending in the axial direction. The opening 350 is generally U-shaped and has an open end 363 and a closed end 367 opposite each other. The receiving section 215 of the housing 210 includes a guide strip 360. The guide strip 360 is arranged in the opening 350, and is connected to the closed end 367 of the opening 350 and extends from the closed end 367 of the opening 350 towards the open end 363. The guide strip 360 is configured for mounting of the indicating slider 230 shown in FIG. 2 and guiding the indicating slider 230 to slide in the axial direction of the housing 210. The guide strip 360 is provided with an identifier 365 which is, for example, a QR code. The identifier 365 is arranged at a distance from the closed end 367.

In addition, the receiving section 215 of the housing 210 is further provided with two pairs of retaining ribs 312. Each pair of retaining ribs 312 are arranged on one of a pair of side walls 318 that define the opening 350. Each pair of retaining ribs 312 are separated from each other by a distance in the axial direction of the housing 210. When viewed in the axial direction of the housing 210, the retaining ribs 312 are at substantially the same level as the identifier 365. The retaining ribs 312 are configured to retain the indicating slider 230 shown in FIG. 2 in an initial position in which the indicating slider 230 at least partially covers the identifier 365.

Figure 4A:
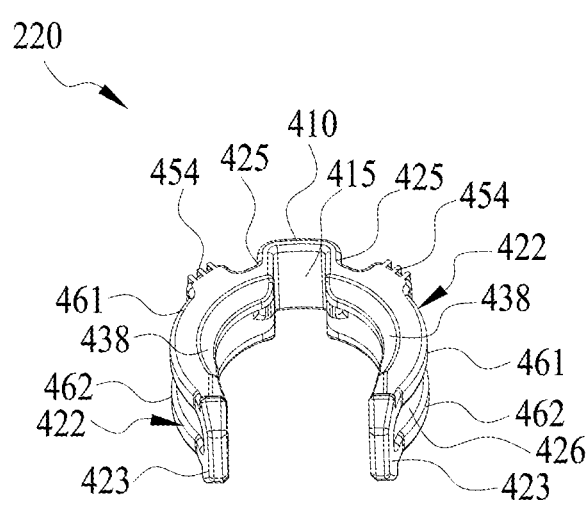
FIG. 4A is a perspective view of a retaining clamp of the female connector shown in FIG. 2 from a first perspective.
Figure 4B:
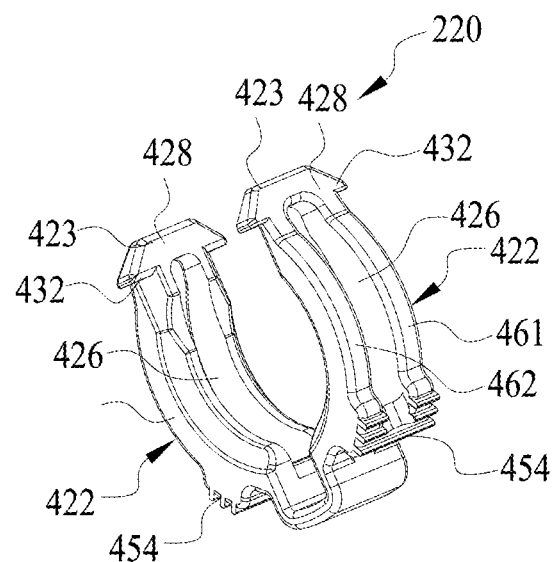
FIG. 4B is a perspective view of the retaining clamp of the female connector shown in FIG. 2 from a second perspective.

FIGS. 4A and 4B are perspective views of the retaining clamp 220 of the female connector 120 from two different perspectives, showing the specific structure of the retaining clamp 220. As shown in FIGS. 4A and 4B, the retaining clamp 220 is a C-shaped clamp with a substantially uniform width, and includes a base 410 and a pair of arms 422. The pair of arms 422 are respectively connected to opposite sides of the base 410 at their proximal ends 425 and each has a free distal end 423. The pair of arms 422 are deflectable relative to the base 410 and thus also deflectable towards or away from each other. The base 410 is provided with a limiting recess 415 for accommodating the beam 315 (limiting portion) of the receiving section 215 of the housing 210. The limiting recess 415 and the beam 315 cooperate with each other to restrict the retaining clamp 220 from moving in the circumferential direction relative to the housing 210.

The pair of arms 422 each is provided with a retaining groove 426. The retaining groove 426 extends in a length direction of a corresponding arm 422 from its proximal end 425 towards a corresponding free distal end 423, and extends through the arm 422 in a thickness direction of the arm 422. The retaining groove 426 has a width configured to be capable of accommodating the retaining flange 116 of the male connector 110.

The arm 422 includes a front arm portion 461 and a rear arm portion 462 on opposite sides of the retaining groove 426 in a width direction. The front arm portion 461 and the rear arm portion 462 are connected at the proximal end 425 and the free distal end 423 of the arm 422, respectively. At the proximal end 425, the front arm portion 461 and the rear arm portion 462 are connected by the base 410. At the free distal end 423, the front arm portion 461 and the rear arm portion 462 are connected to each other by an end arm portion 428. That is, the retaining groove 426 is closed by the end arm portion 428 at the free distal end 423. During insertion of the male connector 110 into the female connector 120, the front arm portion 461 of the retaining clamp 220 comes into contact with the retaining flange 116 of the male connector 110 first. The front arm portion 461 has an outer guide surface 438 inclined inwardly, and is configured to guide the retaining flange 116 of the male connector 110 to enter between the front arm portions 461 of the pair of arms 422.

The pair of arms 422 each is further provided with a stopped portion 432. The stopped portion 432 is formed by protruding from two sides in the width direction of the arm 422, and configured to cooperate with the stopping portions 332 and the additional stopping portions 333 of the housing 210 to retain the retaining clamp 220 on the housing 210. The stopped portions 432 are provided on the end arm portion 428.

The pair of arms 422 each is further provided with an operating projection 454. The operating projection 454 is formed by protruding from an outer surface of each arm 422 and is close to the proximal end 425. By operating the operating projections 454, an operator can deflect the pair of arms 422 of the retaining clamp 220 away from each other such that the retaining clamp 220 can release the retaining flange 116 of the male connector 110.

FIGS. 5A and 5B are perspective views of the indicating slider 230 of the female connector 120 from two different perspectives, showing the specific structure of the indicating slider 230. As shown in FIGS. 5A and 5B, the indicating slider 230 includes a slider body 510 and a pair of extensions 522 extending from the slider body 510. The slider body 510 is provided with a hole 515 through which the indicating slider 230 is sleeved on the guide strip 360 of the housing 210 of the female connector 120, and the indicating slider 230 is movable along the guide strip 360. The extensions 522 are generally in the form of an arc matching with the shape of the inner wall 317 of the receiving section 215 of the housing 210. The pair of extensions 522 extend away from each other.

Figure 8A:
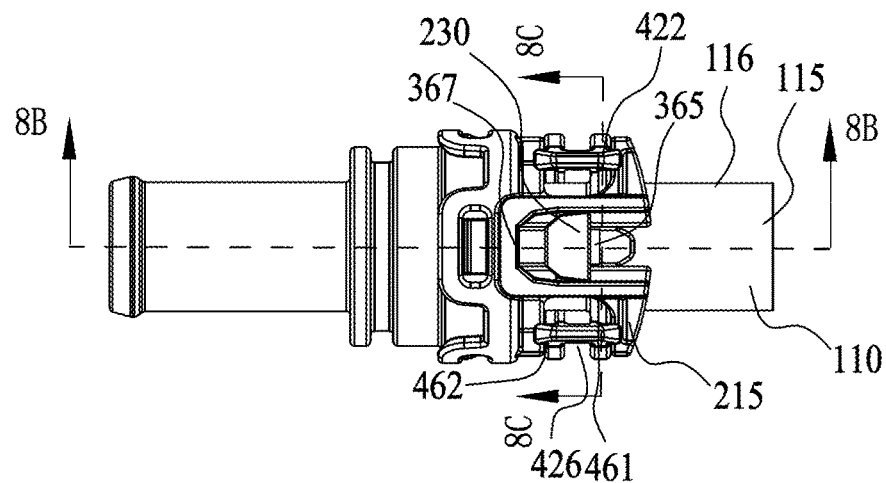
FIG. 8A is a top view of the connector assembly shown in FIG. 1A in an intermediate mounting position.

The slider body 510 is provided with a pair of retained protrusions 512. Each of the retained protrusions 512 forms a retaining structure together with the pair of retaining ribs 312 of the housing 210 to retain the indicating slider 230 in its initial position (as shown in FIGS. 7A and 8A). Specifically, when the indicating slider 230 is not subjected to a pushing force, the retained protrusions 512 can be retained between the pair of retaining ribs 312 of the housing 210, so as to retain the indicating slider 230 in its initial position. When the indicating slider 230 is subjected to a pushing force applied or exerted by the retaining flange 116 of the male connector 110, the retained protrusions 512 can cross over the retaining ribs 312, allowing the indicating slider 230 to move towards the closed end 367 of the opening 350 to reach an indicating position (as shown in FIG. 9A).

FIG. 6A shows a perspective view of assembly of the receiving section 215 of the housing 210, the retaining clamp 220 and the indicating slider 230 of the female connector 120. FIG. 6B is a cross-sectional view of FIG. 6A along line 6B-6B. FIGS. 6A and 6B reflect that the female connector 120 (including the housing 210, the retaining clamp 220 and the indicating slider 230) is in an assembled state, with the connecting section 213 of the housing 210 removed for ease of illustration. In the assembled state of the female connector 120, as shown in FIGS. 6A and 6B, the retaining clamp 220 is arranged around at least part of the receiving section 215 of the housing 210, and the retaining clamp 220 is held on the housing 210 by a clamping force of the pair of arms 422. The portions of the pair of arms 422 of the retaining clamp 220 provided with the limiting grooves 426 enter the channel 125 of the housing 210 from the first side window section 322 and the second side window section 324 respectively, and are in a travel path of the retaining flange 116 of the male connector 110 in the channel 215 of the housing 210. The stopped portions 432 of the retaining clamp 220 are spaced from the stopping portions 332 and the additional stopping portions 333 on the housing 210. The outer guide surface 438 of the front arm section 461 is also in the channel 125 of the housing 210 and faces an entrance to the channel 125. The indicating slider 230 is mounted on the guide strip 360 of the housing 210 and is retained in its initial position. The extensions 522 of the indicating slider 230 extend into the channel 125 of the housing 210 through the opening 350 in the housing 210 and extend in the circumferential direction of, and against, the inner wall 317 of the housing 210. When the indicating slider 230 is in its initial position, in the axial direction, the extensions 522 of the indicating slider 230 are positioned corresponding to the position of the retaining grooves 426 of the arms 422, such that the retaining flange 116 of the male connector 110 needs to push the indicating slider 230 to move the indicating slider 230 out of its initial position before the retaining flange 116 enter the retaining grooves 426. For example, a front end edge of each of the extensions 522 of the indicating slider 230 is aligned with a front side edge of the retaining groove 426, as shown by the dashed line A in FIG. 7B.

Figure 8B:
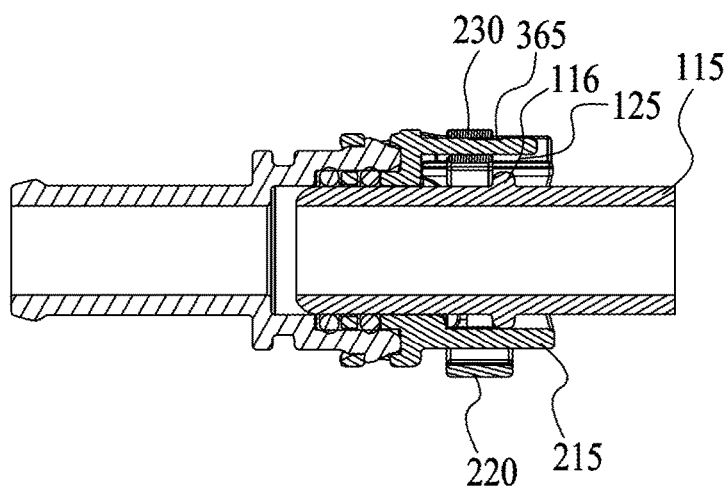
FIG. 8B is a cross-sectional view of the connector assembly of FIG. 8A along line 8B-8B.
Figure 8C:
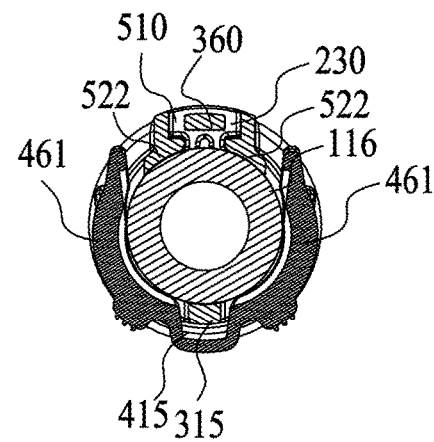
FIG. 8C is a cross-sectional view of the connector assembly of FIG. 8A along line 8C-8C.
Figure 9A:
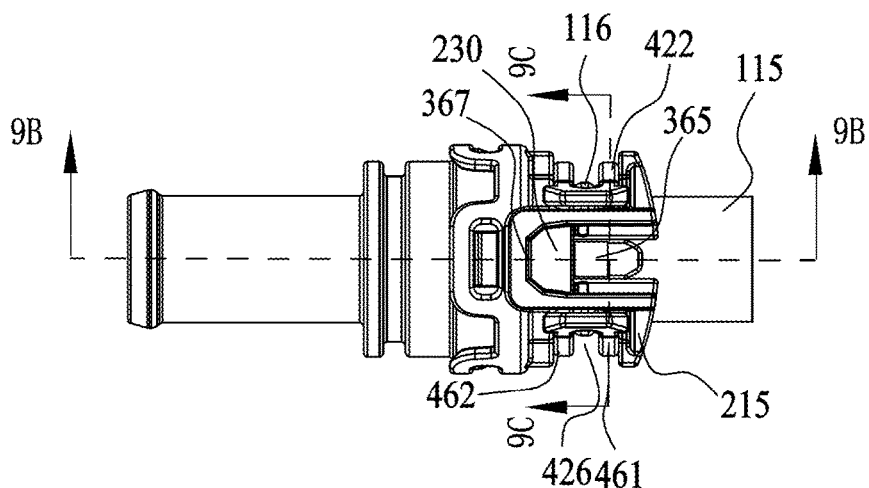
FIG. 9A is a top view of the connector assembly shown of FIG. 1A in a final mounting position.
Figure 9B:
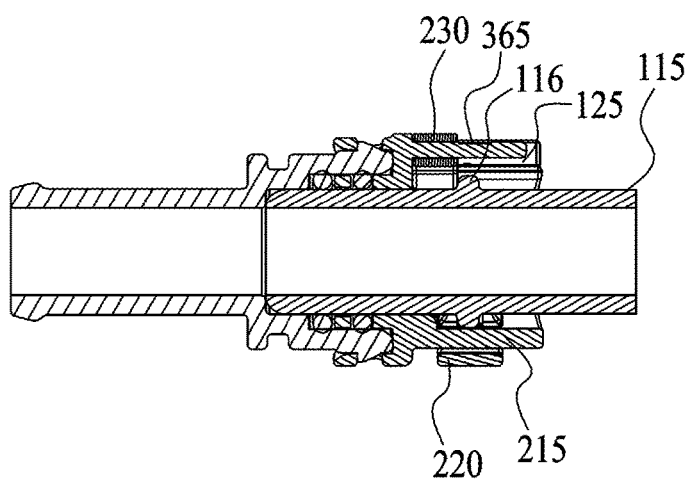
FIG. 9B is a cross-sectional view of the connector assembly of FIG. 9A along line 9B-9B.
Figure 9C:
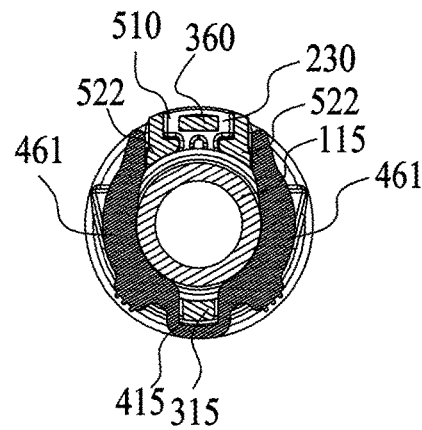
FIG. 9C is a cross-sectional view of the connector assembly of FIG. 9A along line 9C-9C.

FIGS. 7A to 9C show a process of the female connector 120 receiving and being secured with the male connector 110, where FIGS. 7A to 7C show an initial mounting position of the connector assembly 100, FIGS. 8A to 8C show an intermediate mounting position of the connector assembly 100, and FIGS. 9A to 9C show a final mounting position of the connector assembly 100. In the initial mounting position, the male connector 110 begins to be received by the channel 125 of the female connector 120 in the assembled state (as shown in FIGS. 6A and 6B).

Specifically, as shown in FIGS. 7A to 7C, in the initial mounting position, the tubular body 115 of the male connector 110 is inserted into the channel 125 of the female connector 120, but the retaining flange 116 of the male connector 110 has not yet enter the channel 125 of the female connector 120. As shown in FIG. 7C, in the assembled state of the female connector 120, the pair of arms 422 of the retaining clamp 220 and the pair of extensions 522 of the indicating slider 230 together enclose a receiving opening. The receiving opening is capable of accommodating the tubular body 115 of the male connector 110 within it, but is not sufficient to accommodate the retaining flange 116 within it. That is, the pair of arms 422 of the retaining clamp 220 and the pair of extensions 522 of the indicating slider 230 are both in the travel path of the retaining flange 116. Thus, in the initial mounting position, the male connector 110 enters between the pair of arms 422 of the retaining clamp 220, but does not exert a force on the pair of arms 422 that deflects the pair of arms away from each other, and does not exert a force on the extensions 522 of the indicating slider 230 that causes the indicating slider 230 to slide. Further, as shown in FIG. 7A, in the initial mounting position, the indicating slider 230 is in its initial position. In the initial position, the indicating slider 230 is at a distance from the closed end 367 of the opening 360, with the indicating slider 230 covering most of the identifier 365.

As the male connector 110 is inserted further into the channel 125 of the female connector 120 along the axial direction, the retaining flange 116 of the male connector 110 comes into contact with and pushes the front arm portion 461 of each of the pair of arms 422 of the retaining clamp 220, causing the pair of arms 422 of the retaining clamp 220 to be deflected away from each other, such that the retaining flange 116 gradually enters between the front arm portions 461 of the pair of arms 422, and the male connector 110 and the female connector 120 reach the intermediate mounting position as shown in FIGS. 8A to 8C. As shown in FIGS. 8A to 8C, in the intermediate mounting position, the retaining flange 116 is between the front arm portions 461 of the pair of arms 422, such that the pair of arms 422 of the retaining clamp 220 are deflected away from each other and move out of the travel path of the retaining flange 116 under the action of a radial pushing force exerted by the retaining flange 116. Furthermore, in the intermediate mounting position, the indicating slider 230 has not yet been pushed out of its initial position by the retaining flange 116.

As the male connector 110 is inserted further along the axial direction into the channel 125 of the female connector 120 from the intermediate mounting position as shown in FIGS. 8A to 8C until the male connector 110 reaches the final mounting position as shown in FIGS. 9A to 9C, the retaining flange 116 of the male connector 110 travels to be aligned with the retaining grooves 426 of the pair of arms 422 of the retaining clamp 220 and no longer exerts or applies an outward pushing force on the front arm portions 461 of the pair of arms 422. Accordingly, the pair of arms 422 are no longer subjected to the pushing force exerted or applied by the retaining flange 116 and thus the pair of arms 422 are deflected towards each other to return to the travel path of the retaining flange 116, the retaining flange 116 is accommodated in the retaining grooves 426, such that the male connector 110 is secured with the female connector 120 by the retaining clamp 220, that is, the male connector 110 is secured in place with the female connector 120.

Furthermore, during the process from the intermediate mounting position as shown in FIGS. 8A to 8C to the final mounting position as shown in FIGS. 9A to 9C, the retaining flange 116 of the male connector 110 pushes the indicating slider 230 to slide along the guide strip 360 such that the indicating slider 230 reaches the closed end 367 of the opening 360 when the male connector 110 is secured in place with the female connector 120, i.e., reaches its indicating position. An operator observes that the indicating slider 230 is in the indicating position and may determine that the male connector 110 is secured in place with the female connector 120. Furthermore, when the indicating slider 230 is in the indicating position, the indicating slider 230 no longer covers the identifier 365, but fully uncovers the identifier 365. The operator may determine that the male connector 110 is secured in place with the female connector 120 by scanning the identifier 365.

When the male connector 110 needs to be detached from the female connector 120, the operator pushes the pair of operating projections 454 with the index finger and the thumb, so as to cause the pair of arms 422 to be deflected away from each other and out of the travel path of the retaining flange 116 to cause the retaining flange 116 to be disengaged from the retaining grooves 426, whereby the retaining clamp 220 releases the male connector 110 from the female connector 120 and the male connector 110 can be pulled out of the female connector 120.

During the female connector 120 receiving and being secured with the male connector 110, and during releasing and pulling the male connector 110 from the female connector 120, the pair of arms 422 of the retaining clamp 220 may be deflected away from each other to enter the intermediate mounting position as shown in FIGS. 8A to 8C. To prevent the pair of arms 422 of the retaining clamp 220 from being disengaged from the housing 210 when deflected away from each other, present disclosure is provided with the stopped portions 432 on the pair of arms 422 and the stopping portions 322 and the additional stopping portions 323 on the housing 210. When the pair of arms 422 of the retaining clamp 220 are deflected away from each other (or opened) to a certain extent, the stopped portions 432 abut against the stopping portions 322 and the additional stopping portions 323 (not shown in the figures), so as to hold the retaining clamp 220 on the housing 210 and prevent undesirable detachment of the retaining clamp 220 from the housing 210. That is, the stopping portions 322 and the additional stopping portions 323 on the housing 210 are in a travel path along which the stopped portions 432 of the pair of arms 422 move as the pair of arms 422 are deflected away from each other. It should be noted that when the pair of arms 422 of the retaining clamp 220 are deflected away from each other to the extent that the male connector 110 can pass therebetween, the stopped portions 432 may not yet abut against the stopping portions 322 and the additional stop portion 323, but when the pair of arms 422 of the retaining clamp 220 are not yet deflected away from each other to the extent that the male connector 110 can pass therebetween, the stopped portions 432 cannot abut against the stopping portions 322 and the additional stop portions 323. Furthermore, it may be understood by those of skill in the art that since the limiting recess 415 of the retaining clamp 220 is not fixedly connected to the beam 315 on the housing 210, the retaining clamp 220 may move radially relative to the housing 210 during the pair of arms 422 of the retaining clamp 220 being deflected away from each other (see FIGS. 8C and 7C), but the beam 315 on the housing 210 will remain held in the limiting recess 415 to restrict the retaining clamp 220 from moving in the circumferential direction relative to the housing 210.

Figure 10A:
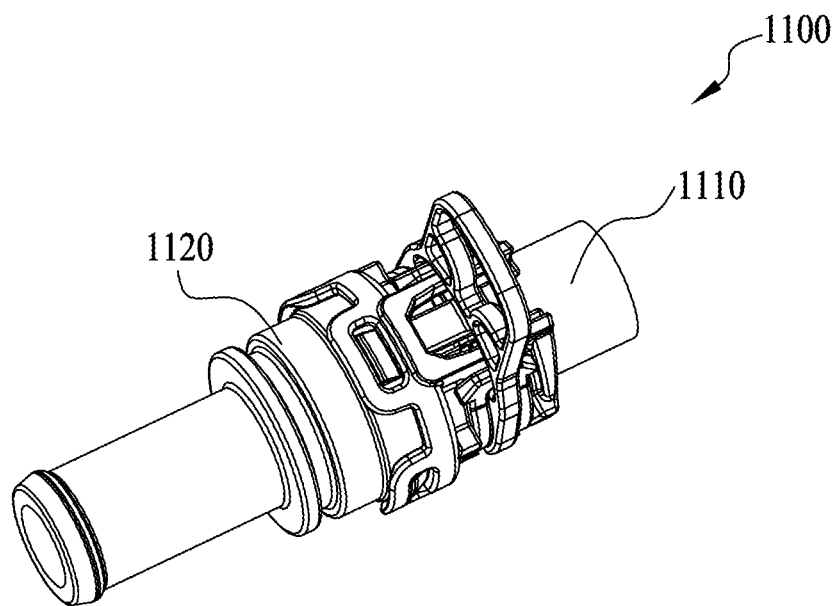
FIG. 10A is a perspective view of a connector assembly according to another embodiment of the present disclosure.
Figure 10B:
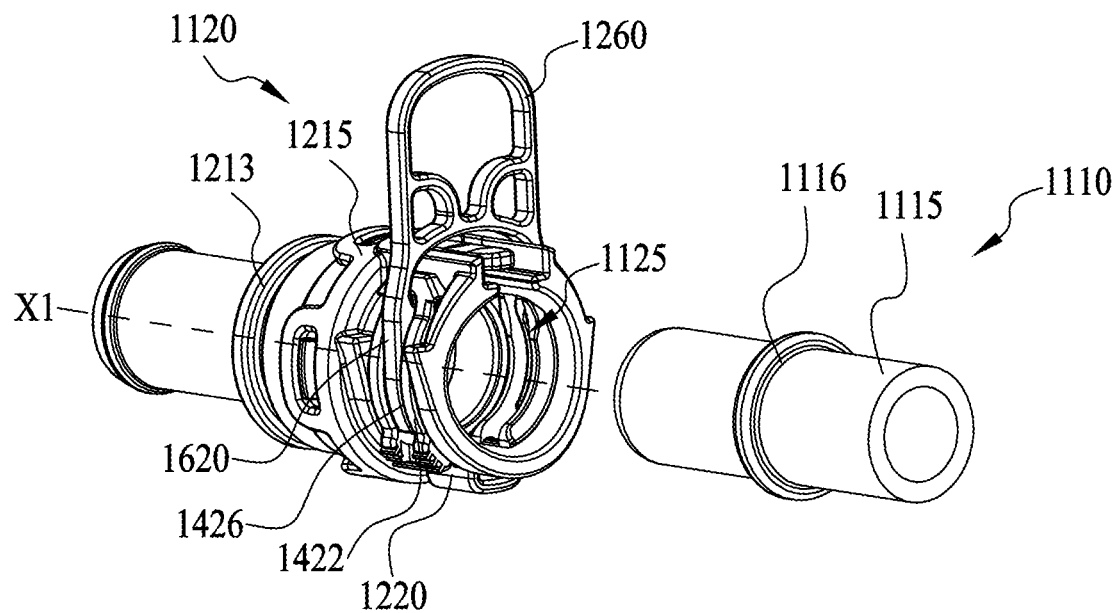
FIG. 10B is a partially exploded view of the connector assembly shown in FIG. 10A.

FIGS. 10A and 10B are perspective views of a connector assembly 1100 according to another embodiment of the present disclosure. The connector assembly 1100 as shown in FIGS. 10A and 10B is identical to the connector assembly 100 shown in FIGS. 1A and 1B except that the components used to indicate that the male connector 110 is secured in place with the female connector 120 are different.

Specifically, the connector assembly 1100 also includes a male connector 1110 and a female connector 1120. The male connector 1110 and the male connector 110 of the connector assembly 100 have the same structure. An assembled state of the female connector 1120 is shown in FIG. 10B.

Figure 11:
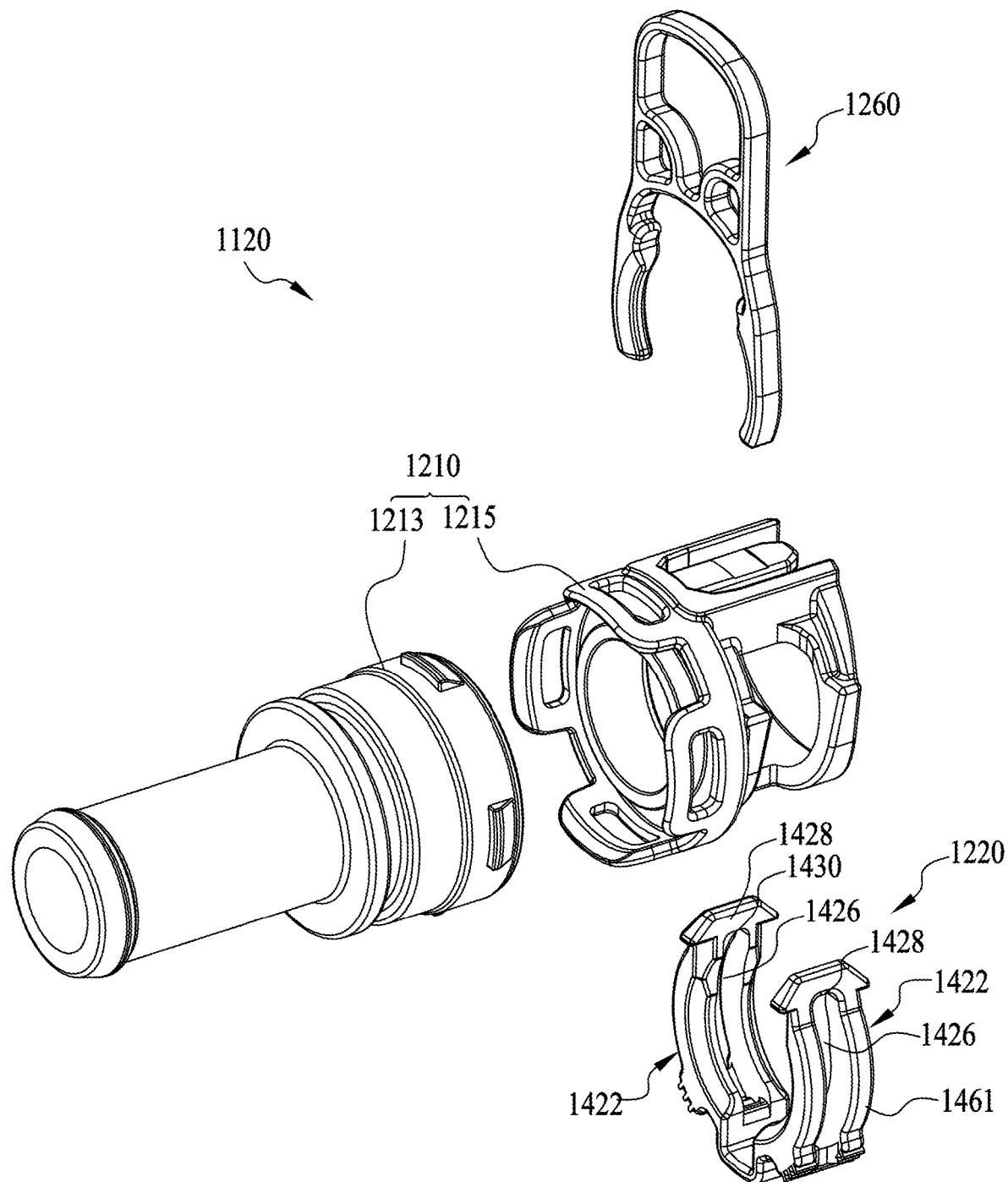
FIG. 11 is an exploded view of a female connector of the connector assembly shown in FIG. 10A.

FIG. 11 is an exploded view of the female connector 1120 of the connector assembly 1100 shown in FIG. 10A. As shown in FIGS. 10B and 11, the female connector 1120 includes a housing 1210, a retaining clamp 1220 arranged on the housing 1210, and an indicating clamp 1260. The specific structure and assembly of the housing 1210 and the retaining clamp 1220 of the female connector 1120 are the same as the specific structure and assembly of the housing 210 and the retaining clamp 220 of the female connector 120 of the connector assembly 100, and details will not be repeated herein. The female connector 1120 includes no indicating slider 230 of the connector assembly 100, but includes the indicating clamp 1260. As shown in FIG. 11, an end arm portion 1428 of a pair of arms 1422 of the retaining clamp 1220 forms a locking portion 1430 for releasably locking the indicating clamp 1260 to the retaining clamp 1220.

Figure 12:
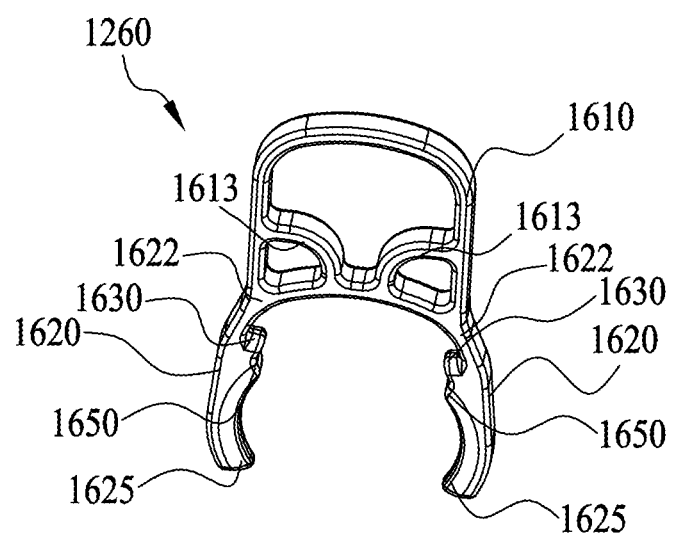
FIG. 12 is a perspective view of an indicating clamp of the female connector shown in FIG. 11.

FIG. 12 is a perspective view of the indicating clamp 1260 of the female connector 1120, showing the specific structure of the indicating clamp 1260. As shown in FIG. 12, the indicating clamp 1260 includes an annular grip 1610 and a pair of legs 1620 connected to the grip 1610. The indicating clamp 1260 is made of a plastic material. The grip 1610 is generally in the form of a square ring with two sub-rings 1613 inside. The grip 1610 is generally elastic and may deform under a force, while the inside sub-rings 1613 can strengthen the grip 1610 to a certain extent, thus limiting the degree of deformation.

The pair of legs 1620 are connected at their proximal ends 1622 to opposite ends of the grip 1610, and have free distal ends 1625. A locked portion 1630 is provided on an inner side of each of the legs 1620. The locked portion 1630 is generally hook-shaped and arranged close to the proximal end 1622. A bump 1650 is further provided on the inner side of each of the legs 1620. The bump 1650 is also arranged close to the proximal end 1622 and is below the locked portion 1630. The bumps 1650 are configured to be engaged with the retaining flange 1116 of the male connector 1110, so as to move the pair of legs 1620 away from each other.

In an assembled state of the female connector 1120 shown in FIG. 10B, the retaining clamp 1220 is held by a clamping force on a receiving section 1215 of the housing 1210. The retaining clamp 1220 and the receiving section 1215 are assembled in the same way as the retaining clamp 220 and the receiving section 215 of the connector assembly 100, and details will not be repeated herein. The indicating clamp 1260 is arranged around at least part of the receiving section 1215 of the housing 1210 and of the retaining clamp 1220, and the indicating clamp 1260 and the retaining clamp 1220 surround the housing 1210 from the opposite sides of the housing 1210. The pair of legs 1620 of the indicating clamp 1260 each at least partially enters a travel path of the retaining flange 1116 of the male connector 1110 in a channel 1215 of the housing 1210 through a retaining groove 1426 on each of the pair of arms 1422 of the retaining clamp 1220. Furthermore, the locked portions 1630 on the pair of legs 1620 of the indicating clamp 1260 engage with the locking portions 1430 provided on the retaining clamp 1220 such that the indicating clamp 1260 is locked to the retaining clamp 1220 (see FIG. 13D). The retaining groove 1426 has a width configured such that the retaining groove 1426 is adapted to receive either of the leg 1620 and the retaining flange 1116, rather than both of the leg 1620 and the retaining flange 1116.

Figure 15A:
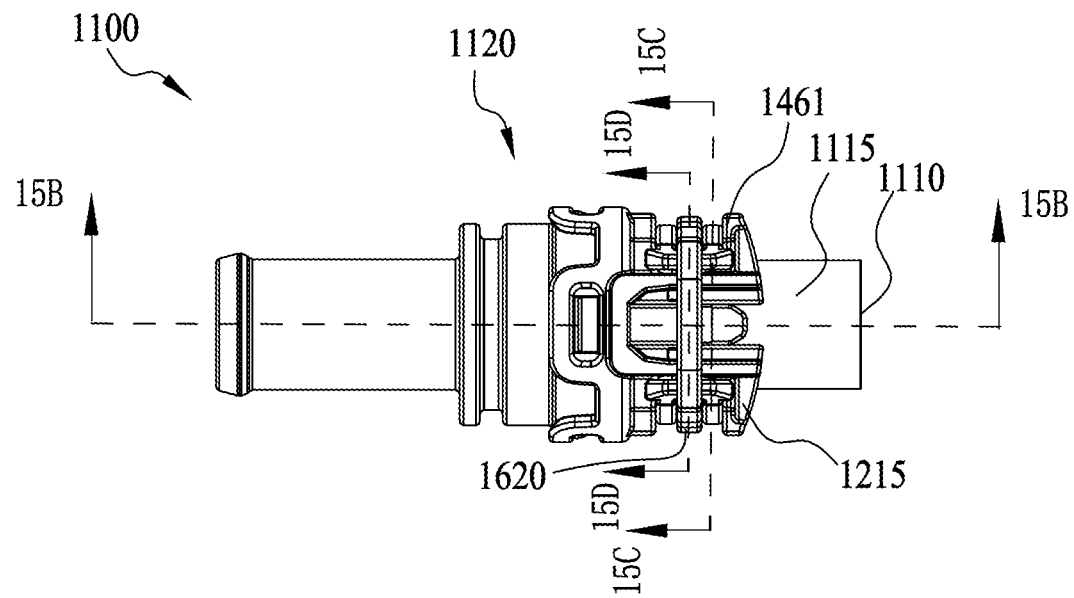
FIG. 15A is a top view of the connector assembly shown of FIG. 10A in a final mounting position.
Figure 15B:
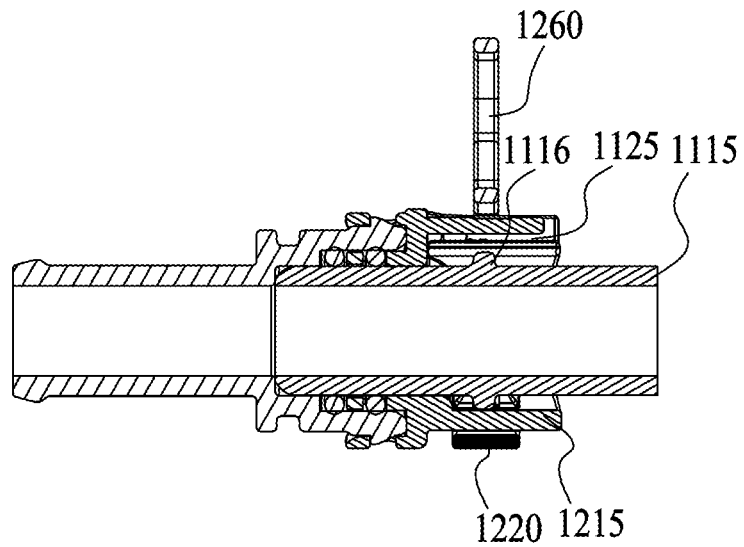
FIG. 15B is a cross-sectional view of the connector assembly of FIG. 15A along line 15B-15B.
Figure 15C:
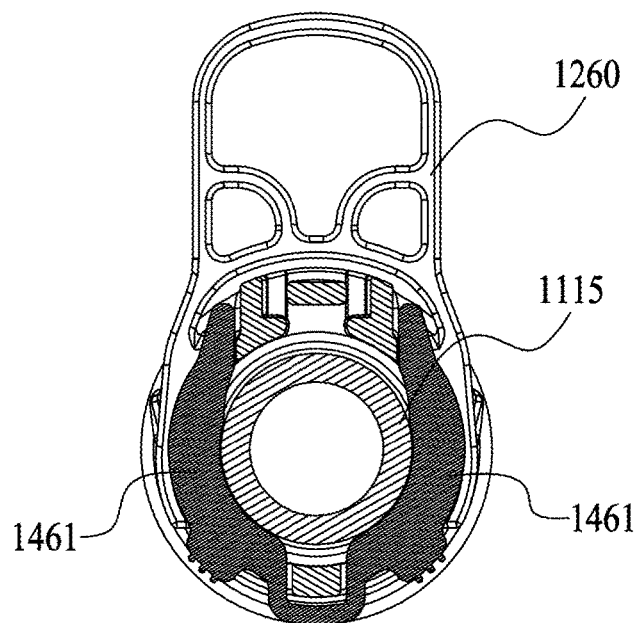
FIG. 15C is a cross-sectional view of the connector assembly of FIG. 15A along line 15C-15C.
Figure 15D:
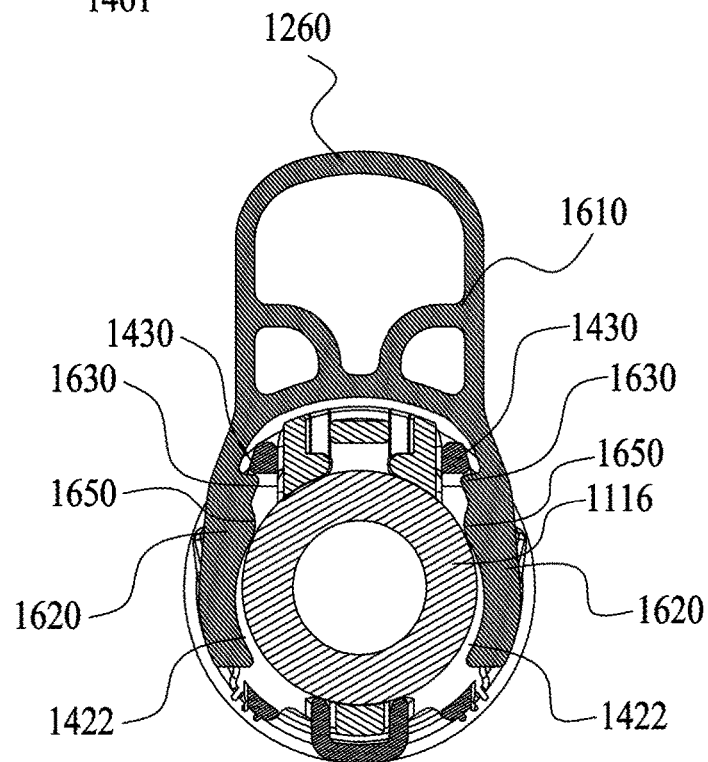
FIG. 15D is a cross-sectional view of the connector assembly of FIG. 15A along line 15D-15D.

According to an embodiment of the present disclosure, the indicating clamp 1260 is configured to be locked to the retaining clamp 1220 when the male connector 1110 is received by the female connector 1120 but not yet secured in position (see FIG. 13D), and to be released from the retaining clamp 1220 when the male connector 1110 is secured in position in the female connector 1120, such that the indicating clamp 1260 can be removed from the retaining clamp 1220 (shown in FIG. 15D). The release of the indicating clamp 1260 from the retaining clamp 1220 is achieved by the retaining flange 1116 of the male connector 1110 acting on the retaining clamp 1220 and the indicating clamp 1260.

FIGS. 13A to 15D show a process of the female connector 1120 receiving and being secured with the male connector 1110, where FIGS. 13A to 13D show an initial mounting position of the connector assembly 1100, FIGS. 14A to 14D show an intermediate mounting position of the connector assembly 1100, and FIGS. 15A to 15D show a final mounting position of the connector assembly 1100. In the initial mounting position, the male connector 1110 begins to be received by the channel 1125 of the female connector 1120 in the assembled state (as shown in FIG. 10B).

Specifically, as shown in FIGS. 13A to 13D, in the initial mounting position, a tubular body 1115 of the male connector 1110 is inserted into the channel 1125 of the female connector 1120, but the retaining flange 1116 of the male connector 1110 has not yet enter the channel 1125 of the female connector 1120.

Figure 13A:
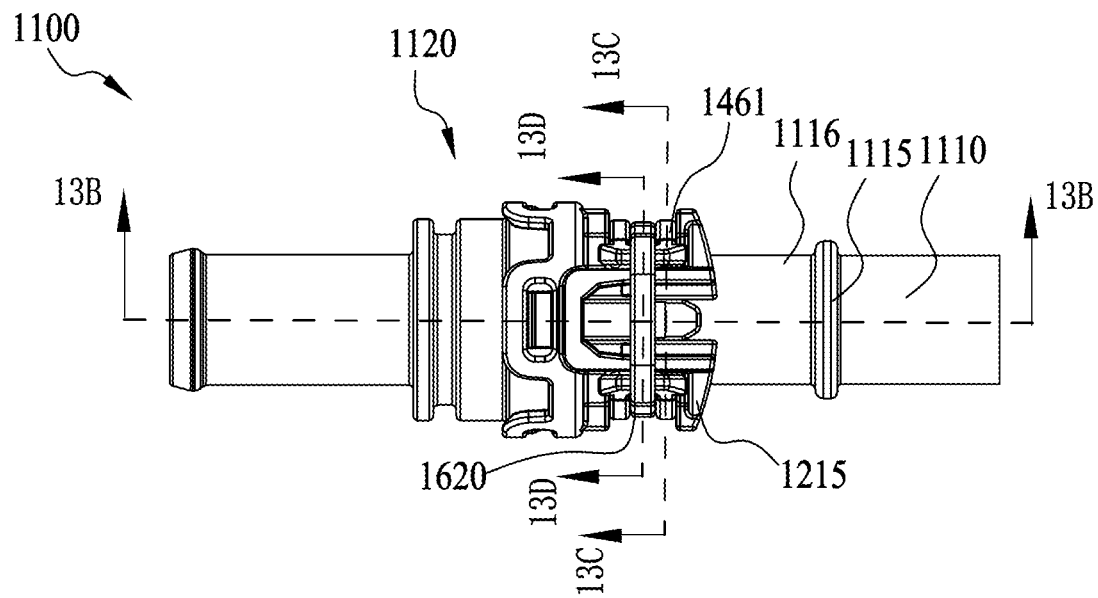
FIG. 13A is a top view of the connector assembly shown in FIG. 10A in an initial mounting position.
Figure 13B:
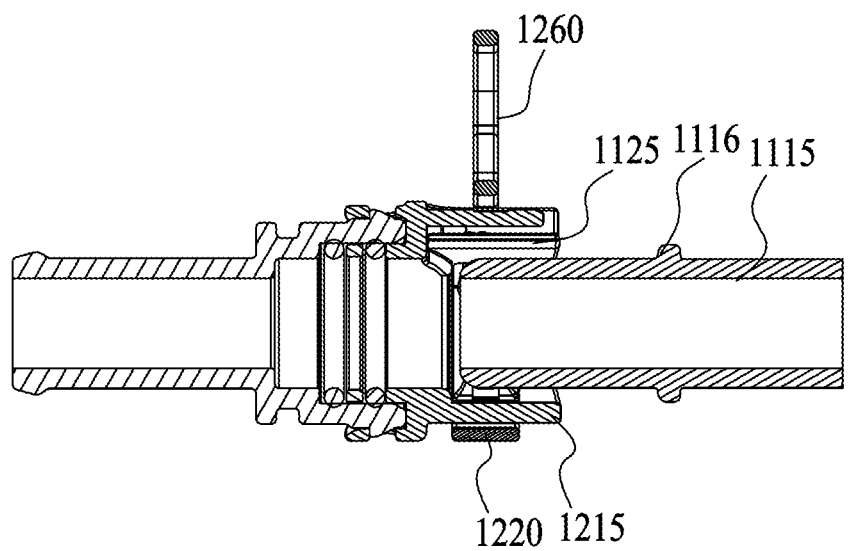
FIG. 13B is a cross-sectional view of the connector assembly of FIG. 13A along line 13B-13B.
Figure 13C:
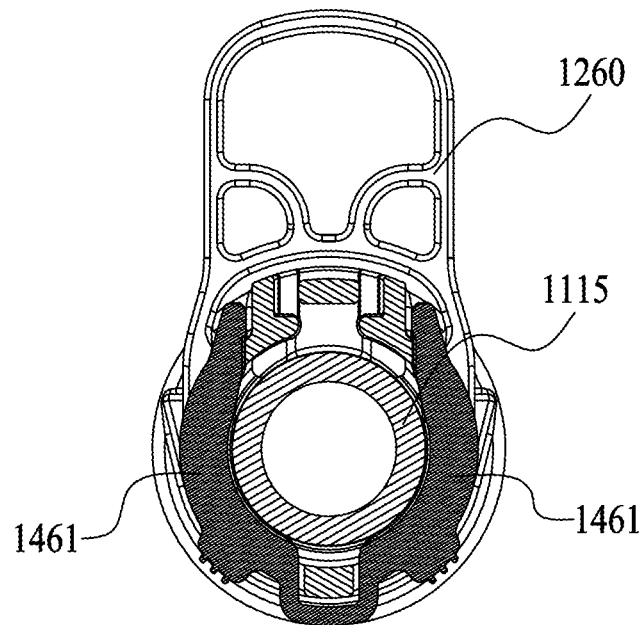
FIG. 13C is a cross-sectional view of the connector assembly of FIG. 13A along line 13C-13C.
Figure 13D:
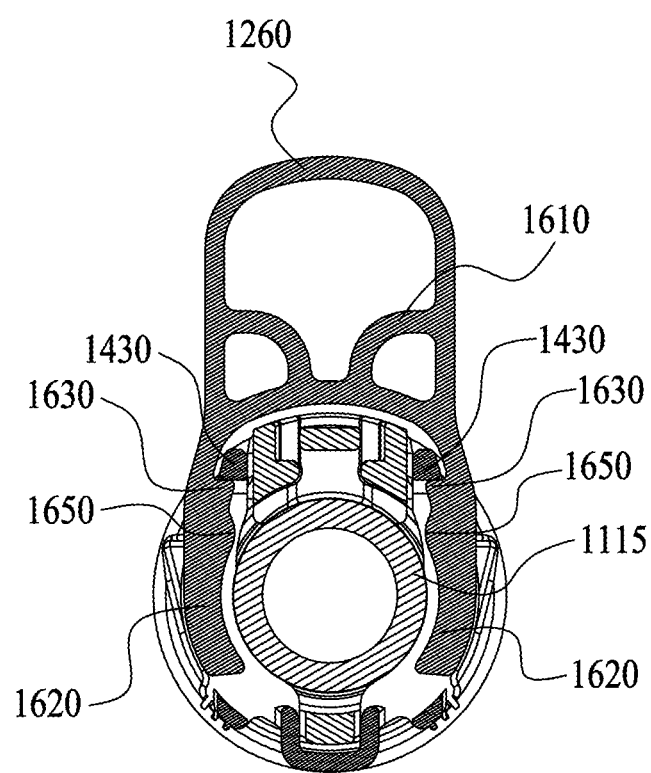
FIG. 13D is a cross-sectional view of the connector assembly of FIG. 13A along line 13D-13D.

As shown in FIG. 13C, in the assembled state of the female connector 1120, the pair of arms 1422 of the retaining clamp 1220 enclose a receiving opening. The receiving opening is capable of accommodating the tubular body 1115 of the male connector 1110 within it, but is not sufficient to accommodate the retaining flange 1116 within it. That is, the pair of arms 1422 of the retaining clamp 1220 are in the travel path of the retaining flange 116. As shown in FIG. 13D, in the assembled state of the female connector 1120, the pair of legs 1620 of the indicating clamp 1260 enclose a receiving opening. The receiving opening is capable of accommodating the tubular body 1115 of the male connector 1110 within it, but is not sufficient to accommodate the retaining flange 1116 within it. That is, the pair of legs 1620 of the indicating clamp 1260 are in the travel path of the retaining flange 1116. Thus, in the initial mounting position, the male connector 1110 enters between the pair of arms 1422 of the retaining clamp 1220 and between the pair of legs 1620 of the indicating clamp 1260, but does not exert a force on the pair of arms 1422 and the pair of legs 1620 which force can deflect the arms as well as the legs away from each other. As shown in FIG. 13D, in the initial mounting position, the locked portions 1630 on the pair of legs 1620 of the indicating clamp 1260 engage with the locking portions 1430 on the retaining clamp 1220 such that the indicating clamp 1260 is locked to the retaining clamp 1220 and cannot be pulled out or removed. In addition, in the initial mounting position, the bumps 1630 on the pair of legs 1620 of the indicating clamp 1260 are not in contact with the tubular body 1115 of the male connector 1110, but are at a certain distance from the tubular body.

As the male connector 1110 is inserted further into the channel 1125 of the female connector 1120 along the axial direction, the retaining flange 1116 of the male connector 1110 comes into contact with and pushes front arm portion 1461 of each of the pair of arms 1422 of the retaining clamp 1220, causing the pair of arms 1422 of the retaining clamp 1220 to be deflected away from each other, such that the retaining flange 1116 gradually enters between the front arm portions 1461 of the pair of arms 1422, and the male connector 1110 and the female connector 1120 reach the intermediate mounting position as shown in FIGS. 14A to 14D.

Figure 14A:
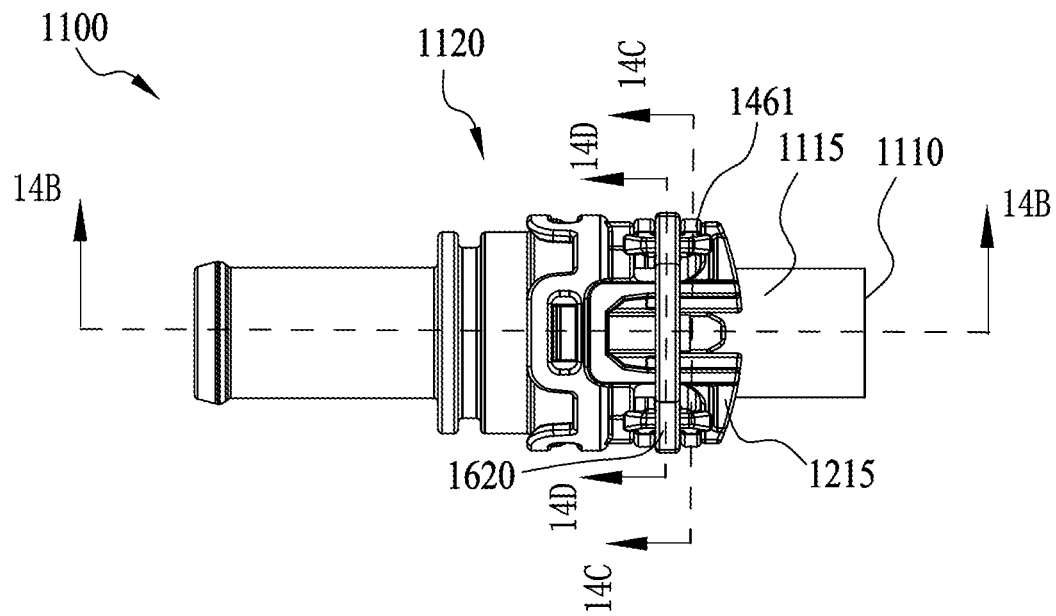
FIG. 14A is a top view of the connector assembly shown in FIG. 10A in an intermediate mounting position.
Figure 14B:
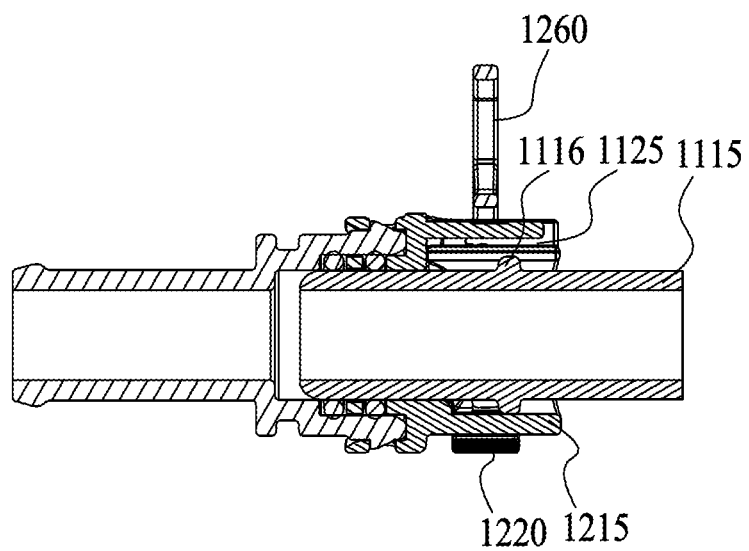
FIG. 14B is a cross-sectional view of the connector assembly of FIG. 14A along line 14B-14B.
Figure 14C:
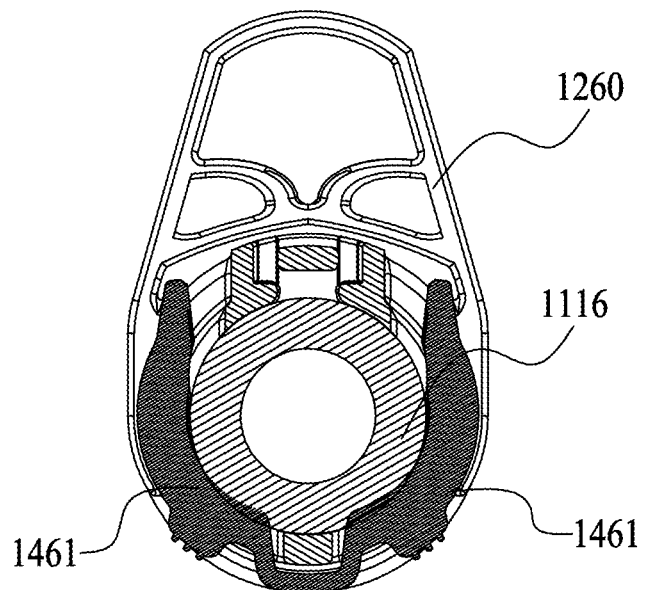
FIG. 14C is a cross-sectional view of the connector assembly of FIG. 14A along line 14C-14C.
Figure 14D:
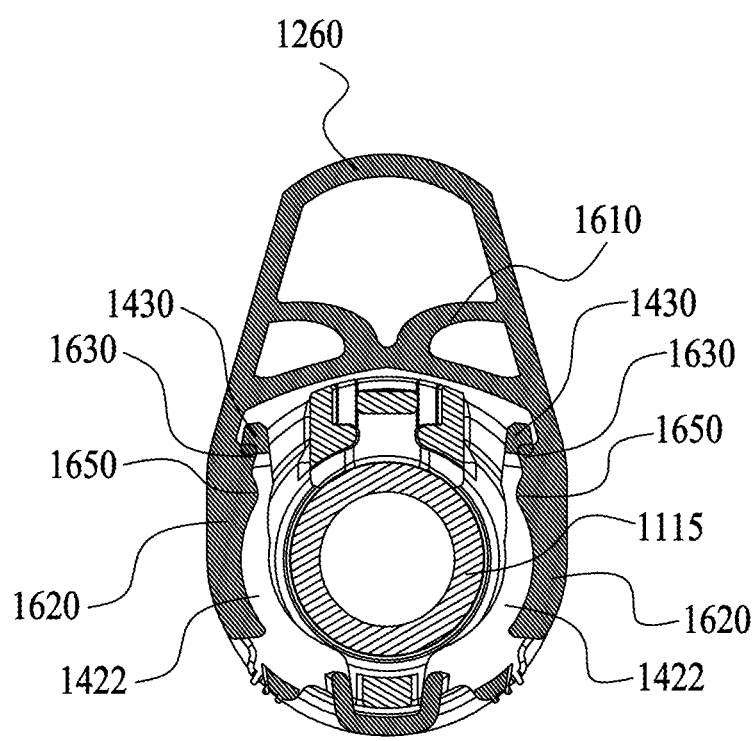
FIG. 14D is a cross-sectional view of the connector assembly of FIG. 14A along line 14D-14D.

As shown in FIGS. 14A to 14D, in the intermediate mounting position, the retaining flange 1116 is between the front arm portions 1461 of the pair of arms 1422, such that the pair of arms 1422 of the retaining clamp 1220 are deflected away from each other and move out of the travel path of the retaining flange 1116 under the action of a radial pushing force exerted by the retaining flange 1116. Since the pair of legs 1620 of the indicating clamp 1260 are locked to the pair of arms 1422 of the retaining clamp 1220, the pair of legs 1620 of the indicating clamp 1260 move away from each other, i.e., are expanded from each other, as the pair of arms 1422 of the retaining clamp 1220 are deflected away from each other. As can be seen in FIG. 14D, the grip 1610 of the indicating clamp 1260 deforms in a way that allows for the movement of the pair of legs 1620 described above. Furthermore, as shown in FIG. 14D, in the intermediate mounting position, the locked portions 1630 on the pair of legs 1620 of the indicating clamp 1260 remain engaged with the locking portions 1430 on the retaining clamp 1220, such that the indicating clamp 1260 remains locked to the retaining clamp 1220 and cannot be pulled out or removed. Moreover, in the intermediate mounting position, the bumps 1630 on the pair of legs 1620 of the indicating clamp 1260 remain out of contact with the tubular body 1115 of the male connector 1110 and become further away from the tubular body 1115 than in the initial mounting position.

As the male connector 1110 is inserted further along the axial direction into the channel 1125 of the female connector 1120 from the intermediate mounting position as shown in FIGS. 14A to 14D until the male connector 1110 reaches the final mounting position as shown in FIGS. 15A to 15D, the retaining flange 1116 of the male connector 1110 travels to be aligned with the retaining grooves 1426 of the pair of arms 1422 of the retaining clamp 1220 and no longer exerts an outward pushing force on the front arm portions 1461 of the pair of arms 1422. Accordingly, the pair of arms 1422 are no longer acted on by the pushing force exerted by the retaining flange 1116, the pair of arms 1422 are thus deflected towards each other to return to the travel path of the retaining flange 1116, and the retaining flange 1116 is accommodated inside the retaining grooves 1426. In this way, the male connector 1110 and the female connector 1120 are secured by the retaining clamp 1220, that is, the male connector 1110 is secured in place with the female connector 1120.

Furthermore, when the retaining flange 1116 of the male connector 1110 travels to be aligned with the retaining grooves 1426 on the pair of arms 1422 of the retaining clamp 1220, the retaining flange 1116 of the male connector 1110 is also between the pair of legs 1620 of the indicating clamp 1260 respectively accommodated inside the retaining grooves 1426 on the pair of arms 1422, such that when the pair of arms 1422 are deflected towards each other to return (or rebound) to the travel path of the retaining flange 1116, the pair of legs 1620 of the indicating clamp 1260 comes into contact with the retaining flange 1116 of the male connector 1110 via the bumps 1650 on the inner side thereof (see FIG. 15D), whereby the retaining flange 1116 keeps the pair of legs 1620 away from each other. Thereby, the locked portions 1630 on the pair of legs 1620 are disengaged from the locking portions 1430 on the pair of arms 1422 (see FIG. 15D), allowing the indicating clamp 1260 to be removed or pulled from the retaining clamp 1220.

Figure 16:
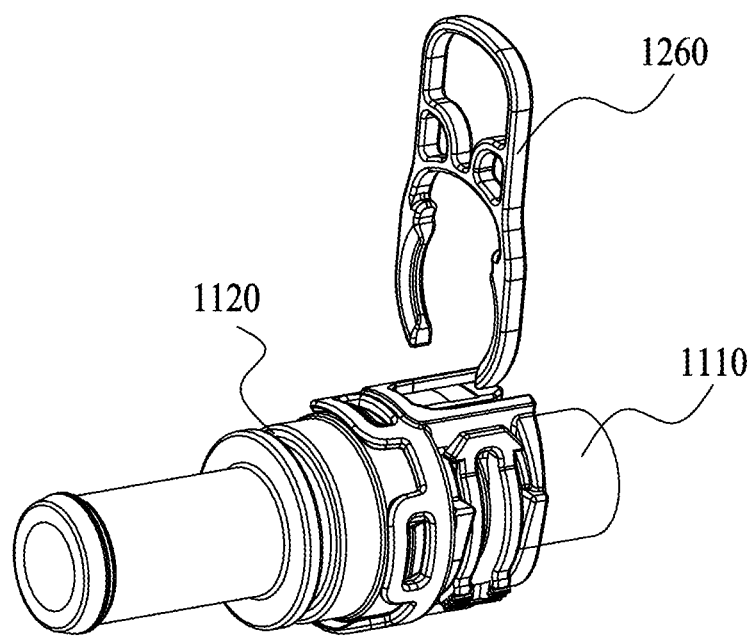
FIG. 16 is a perspective view of the connector assembly shown in FIG. 10A with the indicating clamp removed.

FIG. 16 is a perspective view of the connector assembly shown in FIG. 10A with the indicating clamp 1260 removed. As shown in FIG. 16, the indicating clamp 1260 is removed from the connector assembly 1100 which is in the final mounting position. When the connector assembly 1100 reaches the final mounting position as shown in FIGS. 15A to 15D, the operator can remove or pull the indicating clamp 1260 from the retaining clamp 1220 by holding the grip 1610 of the indicating clamp 1260. The operator determines that the male connector 1100 is secured in position in the female connector 1120 by removing or pulling the indicating clamp 1260 out.

The female connectors of the present disclosure are suitable for receiving and being secured with the male connector provided with the retaining flange on the outer surface thereof. The female connectors of the present disclosure include only three simple components, i.e., a housing, a retaining clamp and an indicating component (the indicating slider or indicating clamp), to enable the operation of receiving and securing as well as the operation of releasing and pulling-out of the male connector, and the operations are easily carried out.

The female connectors of the present disclosure further have an error-proofing mechanism, i.e., an indicating component, to prevent incorrect mounting of the male connector to the female connector. The error-proofing mechanism of the present disclosure may be multi-dimensional. For example, in an embodiment where the indicating slider is used, two error-proofing mechanisms are used at the same time, including scanning the QR code and observing whether the indicating slider reaches the indicating position, thereby achieving a higher error-proof reliability. The indicating component of the present disclosure is also simple in structure and easy to operate.

The present disclosure provides female connectors suitable for different scenarios. For example, the embodiment of the present disclosure using the indicating slider is suitable for a scenario where a QR code needs to be scanned to confirm that the male connector is mounted in place in the female connector. In addition, both the retaining clamp and the indicating slider of the connector assembly in the above embodiment fit closely with the housing of the female connector, such that the entire female connector has a compact size in the circumferential direction, which makes the above embodiment also suitable for a scenario in which mounting space and operating space are compact.

For another example, the embodiment of the present disclosure in which the indicating clamp is used is suitable for a scenario where the operator cannot visually observe the position of the indicating component, for example where the connector assembly is used in special working environment such as underwater or underground. In the above-mentioned working environment, the indicating clamp of the present disclosure can be placed vertically and exposed from the water or the ground, such that the operator can operate the grip of the indicating clamp and pull the indicating clamp out.

Although the present disclosure is disclosed with respect to the embodiments described above, various alternatives, modifications, variations, improvements, and/or substantial equivalents that are known or current or to be anticipated in the future may be obvious to those of ordinary skills in the art. Furthermore, the technical effects and/or technical problems described in the description are exemplary rather than limiting, so the disclosure of this description may be used to solve other technical problems and have other technical effects. Accordingly, the embodiments of the present disclosure as set forth above are intended to be illustrative rather than limiting. Various changes may be made without departing from the spirit or scope of the present disclosure. Therefore, the present disclosure is intended to encompass all known or earlier disclosed alternatives, modifications, variations, improvements, and/or substantial equivalents.

What is claimed is:

1. A female connector for receiving and being secured with a male connector having a retaining flange, comprising:
   a housing defining therein a channel extending in an axial direction and being provided with a housing window, wherein the housing comprises a pair of stopping portions provided on an outer surface thereof and respectively on two opposite sides thereof in a circumferential direction;

a retaining clamp arranged around at least part of the housing, the retaining clamp comprising a pair of arms and a pair of stopped portions respectively provided on the pair of arms, the pair of arms being connected to each other and deflectable towards or away from each other, the pair of arms each being provided with a retaining groove, wherein a portion of each of the pair of arms that is provided with the retaining groove enters the channel of the housing through the housing window and is in a travel path of the retaining flange;

wherein the retaining clamp is configured such that during the female connector receiving and being secured with the male connector:

when the male connector travels relative to the housing until the retaining flange is in contact with the pair of arms but is not yet aligned with the retaining grooves, the retaining flange exerts a pushing force on the pair of arms to deflect the pair of arms away from each other and out of the travel path of the retaining flange;

when the male connector travels until the retaining flange is aligned with the retaining grooves, the pair of arms are no longer subjected to the pushing force exerted by the retaining flange and are deflected towards each other to return to the travel path of the retaining flange, and the retaining flange is accommodated inside the retaining grooves, such that the male connector and the female connector are secured by the retaining clamp; and wherein when no pushing force is applied to the pair of arms, the retaining clamp is held on the housing by a clamping force of the pair of arms, and when the pair of arms are deflected away from each other to a certain extent by application of a pushing force, the stopped portions of the pair of arms respectively abut against the pair of stopping portions of the housing to hold the retaining clamp on the housing.

2. The female connector according to claim 1,
wherein each of the pair of arms has a width direction;
wherein each of the pair of arms comprises a front arm portion and a rear arm portion, wherein the retaining groove is between the front arm portion and the rear arm portion in the width direction; and
wherein, during the female connector receiving and being secured with the male connector, the retaining flange exerts a pushing force on the front arm portions such that the pair of arms are deflected away from each other and, after the retaining flange is accommodated in the retaining grooves, the front arm portion and the rear arm portion restrict the retaining flange from moving along the channel.

3. The female connector according to claim 2, wherein the front arm portion has an outer guide surface inclined inwardly, the outer guide surface being configured to guide the retaining flange of the male connector to enter between the front arm portions of the pair of arms.

4. The female connector according to claim 2,
wherein the stopped portions protrude from two sides of each of the pair of arms in the width direction; and
wherein the pair of stopping portions protrude from the outer surface of the housing.

5. The female connector according to claim 2,
wherein the retaining clamp further comprises a pair of operating projections respectively provided on the pair of arms;
wherein the pair of arms are configured to be deflected away from each other under a pushing force applied by an operator operating the pair of operating projections, se as to release the male connector from the female connector.

6. The female connector according to claim 2, wherein
wherein the retaining clamp further comprises a base, the pair of arms each being connected to the base at a proximal end thereof and being deflectable relative to the base, and the base having a limiting recess; and
wherein the housing is provided with a limiting portion, the limiting portion being accommodated in the limiting recess to restrict the retaining clamp from moving in the circumferential direction relative to the housing.

7. The female connector according to claim 6,
wherein the housing window comprises a first side window section and a second side window section, the pair of arms at least partially entering the channel of the housing through the first side window section and the second side window section respectively; and
wherein the housing further comprises a beam provided between the first side window section and the second side window section, the beam forming the limiting portion.

8. The female connector according to claim 6, wherein the pair of arms each has a free distal end, the stopped portion being provided at the free distal end.

9. The female connector according to claim 8, wherein the retaining groove extends from the proximal end to the free distal end of the arm, the front arm portion and the rear arm portion being connected at the free distal end by an end arm portion.

10. The female connector according to claim 1, wherein the retaining groove runs through the arm in a thickness direction of the arm.

11. The female connector according to claim 1, wherein the retaining clamp is C-shaped.

12. A connector assembly, comprising:
the female connector according to claim 1; and
a male connector received by and secured with the female connector.

13. A female connector configured to receive and secure a male connector having a retaining flange, comprising:
a housing defining a channel extending in an axial direction, the housing including:
a housing window; and
a pair of stopping portions formed on an outer surface of the housing on opposite sides in a circumferential direction; and
a retaining clamp arranged around at least part of the housing, the retaining clamp including:
a pair of arms connected to each other and deflectable toward and away from each other;
a pair of stopped portions respectively provided on the pair of arms; and
a retaining groove formed on each of the pair of arms, wherein a portion of each arm that includes the retaining groove extends into the channel of the housing through the housing window and lies in a travel path of the retaining flange.

14. The female connector according to claim 13, wherein the flange is configured to apply a pushing force to deflect the arms away from each other and out of its travel path when the retaining flange contacts but is not yet aligned with the retaining grooves.

15. The female connector according to claim 14, wherein, when the retaining flange becomes aligned with the retaining grooves, the pushing force ceases, the arms are configured to deflect back toward each other into the travel path, and the flange is received in the retaining grooves, thereby securing the male and female connectors together.

16. The female connector according to claim 13,
wherein each of the pair of arms has a width direction, each of the pair of arms comprises a front arm portion and a rear arm portion, the retaining groove being positioned between the front arm portion and the rear arm portion in the width direction, and
wherein, during the female connector receiving and being secured with the male connector, the retaining flange applies a pushing force to the front arm portions such that the pair of arms are deflected away from each other, and, after the retaining flange is received in the retaining grooves, the front arm portion and the rear arm portion restrict movement of the retaining flange along the channel.

17. The female connector according to claim 16, wherein the front arm portion includes an outer guide surface inclined inwardly, the guide surface being configured to guide the retaining flange of the male connector into a space between the front arm portions of the pair of arms.

18. The female connector according to claim 16, wherein the stopped portions protrude from opposite sides of each of the pair of arms in the width direction, and the pair of stopping portions protrude from the outer surface of the housing.

19. The female connector according to claim 16,
wherein the retaining clamp further comprises a pair of operating projections respectively provided on the pair of arms, and
wherein the pair of arms are configured to be deflected away from each other under a pushing force applied by an operator to the operating projections to release the male connector from the female connector.

20. The female connector according to claim 13, wherein during connection of the male connector to the female connector:
when no pushing force is applied to the arms, the retaining clamp is held on the housing by a clamping force of the arms; and
when a pushing force deflects the arms outward beyond a certain extent, the stopped portions of the arms abut against the stopping portions of the housing to retain the clamp on the housing.

* * * * *